United States Patent
Chung et al.

(10) Patent No.: US 9,729,686 B2
(45) Date of Patent: Aug. 8, 2017

(54) ELECTRONIC DEVICE HAVING A CIRCUIT BOARD IN CONTACT WITH A CASE

(71) Applicant: Samsung Electronics Co., Ltd., Gyeonggi-do (KR)

(72) Inventors: Seung-Soo Chung, Seoul (KR); Jong-Min Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 111 days.

(21) Appl. No.: 14/517,149

(22) Filed: Oct. 17, 2014

(65) Prior Publication Data

US 2015/0173245 A1 Jun. 18, 2015

(30) Foreign Application Priority Data

Dec. 18, 2013 (KR) .................. 10-2013-0158735
Feb. 21, 2014 (KR) .................. 10-2014-0020846

(51) Int. Cl.
*H04M 1/02* (2006.01)
*H04M 1/23* (2006.01)

(52) U.S. Cl.
CPC ........ *H04M 1/0277* (2013.01); *H04M 1/0274* (2013.01); *H04M 1/236* (2013.01)

(58) Field of Classification Search
CPC ..... G06F 1/1616–1/1667; G06F 1/163–1/181; G06F 1/185; G06F 3/0202; E05B 73/0082; H05K 1/144; H05K 7/023; H05K 7/1418; H01R 29/00; H01J 5/32; H01J 5/42; H01K 1/46; H01L 23/10; H01L 2924/01079; G02B 6/4248; H02G 3/14

USPC .......... 361/807–812; 174/17.05–17.08, 174/50–50.63, 559–564
See application file for complete search history.

(56) References Cited

U.S. PATENT DOCUMENTS

| | | | | |
|---|---|---|---|---|
| 5,324,902 | A * | 6/1994 | Shen ............... | H01H 13/705 200/516 |
| 2012/0050170 | A1* | 3/2012 | Akens .............. | H04M 1/23 345/170 |
| 2012/0092812 | A1* | 4/2012 | Lewis .............. | A61B 5/14532 361/679.01 |
| 2012/0092823 | A1* | 4/2012 | Wotton ............ | B62J 11/00 361/679.31 |
| 2012/0320503 | A1* | 12/2012 | Yturralde ......... | G06F 1/1628 361/679.01 |
| 2013/0077215 | A1* | 3/2013 | Tada ................ | G06K 9/00006 361/679.01 |
| 2013/0176665 | A1* | 7/2013 | Oi .................... | H04B 1/3888 361/679.01 |
| 2013/0271902 | A1* | 10/2013 | Lai ................... | H04R 1/02 361/679.01 |
| 2013/0299324 | A1* | 11/2013 | Kanbayashi ...... | H01H 9/04 200/302.1 |
| 2014/0031093 | A1* | 1/2014 | Song ................ | H04B 1/3888 455/575.1 |

(Continued)

*Primary Examiner* — Zachary M Pape
*Assistant Examiner* — Amir Jalali
(74) *Attorney, Agent, or Firm* — The Farrell Law Firm, P.C.

(57) ABSTRACT

An electronic device is provided. The electronic device includes a case member that includes an opening, an electric component provided on the case member, and a circuit board connected to the electric component via the opening, wherein a portion of the circuit board contacts the case member to seal the opening.

25 Claims, 13 Drawing Sheets

(56) References Cited

U.S. PATENT DOCUMENTS

| | | | |
|---|---|---|---|
| 2014/0078708 A1* | 3/2014 | Song | H04M 1/0264 |
| | | | 361/809 |
| 2014/0111920 A1* | 4/2014 | Takita | H05K 5/069 |
| | | | 361/679.01 |
| 2014/0198466 A1* | 7/2014 | Sawadski | H01Q 1/243 |
| | | | 361/751 |
| 2014/0293557 A1* | 10/2014 | Iijima | H04M 1/18 |
| | | | 361/752 |
| 2015/0061477 A1* | 3/2015 | Wilson | H04B 1/3888 |
| | | | 312/223.1 |
| 2015/0062787 A1* | 3/2015 | Wilson | H04M 1/185 |
| | | | 361/679.01 |
| 2015/0155614 A1* | 6/2015 | Youn | H04M 1/0249 |
| | | | 343/702 |

* cited by examiner

ELECTRONIC DEVICE HAVING A CIRCUIT BOARD IN CONTACT WITH A CASE

PRIORITY

This application claims priority under 35 U.S.C. §119(a) to Korean Patent Application Serial No. 10-2013-0158735, which was filed in the Korean Intellectual Property Office on Dec. 18, 2013, and Korean Patent Application Serial No. 10-2014-0020846, which was filed in the Korean Intellectual Property Office on Feb. 21, 2014, the entire contents of which are incorporated herein by reference.

BACKGROUND OF THE INVENTION

1. Field of the Invention

The present disclosure relates generally to an electronic device, and more particularly, to an electronic device having a portion of a circuit board contacting a case to seal an opening in the case.

2. Description of the Related Art

An electronic device performs particular functions according to embedded programs, and may be embodied as, for example, an electronic appliance, an electronic notepad, a portable multimedia player, a mobile communication terminal, a tablet Personal Computer (PC), a video/audio device, a desktop/laptop computer, a vehicle navigation system, etc. For example, the electronic device may output stored information as audio or video. As the integration of electronic devices has increased, and use of high-volume and ultra-high-speed wireless communication has become increasingly common, the variety of functions that can be provided by a single mobile communication terminal has also increased. For example, a mobile communication terminal may include communication functions as well as entertainment functions, such as games, multimedia functions for playback of music/video, communication and security functions for mobile banking, functions for schedule management, and/or an electronic wallet.

Depending on a use environment, the electronic device may need a dust-proof structure and a water-proof structure to guarantee a smooth operation and to prevent introduction of foreign substances. For example, from various network devices to PCs, a dust-proof screen for preventing dust from being introduced to the devices during an operation process may be installed in an electronic device. The dust-proof structure and the water-proof structure may be properly installed and used by an operator and a manufacturer, taking installation and operation environment of the electronic device into account.

In a fixedly installed electronic device, for example, when an electronic device capable of constantly operating within a relatively consistent and maintained operation environment, it may not be necessary to separately install a dust-proof structure and a water-proof structure. For instance, an electronic device installed in a semiconductor producing facility may maintain a constant environment because the producing facility is installed in an environment that maintains predetermined temperature and humidity and a dust-proof device is installed in an inlet of the producing facility, such that the electronic device does not need a dust-proof structure or a water-proof structure.

However, even an electronic device such as a home appliance used in a fixed position may need a dust-proof structure and a water-proof structure in an environment having a distinctive change in a season, temperature, or humidity.

In many common electronic devices, which may have a portion of the device in which various other structures are coupled or a portion of the device that connects an interior of the device with to an exterior of the device, for example, a wiring path of an input/output device, may be a path through which external foreign substances or moisture are introduced.

SUMMARY OF THE INVENTION

The present disclosure has been provided to at least partially address, alleviate, or remove at least one of problems and/or disadvantages described above.

Accordingly, an aspect of the present disclosure provides an electronic device having a water-proof function.

Another aspect of the present disclosure provides an electronic device having a dust-proof/water-proof function to operate stably in spite of a change in a season, temperature, or humidity.

Another aspect of the present disclosure provides an electronic device that is easy to miniaturize while having a dust-proof/water-proof function.

According to an aspect of the present disclosure, an electronic device is provided. The electronic device includes a case member, which includes an opening, an electric component provided on the case member, and a circuit board connected to the electric component via the opening, wherein a portion of the circuit board contacts the case member to seal the opening.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EMBODIMENTS OF THE PRESENT INVENTION

Figure 1:
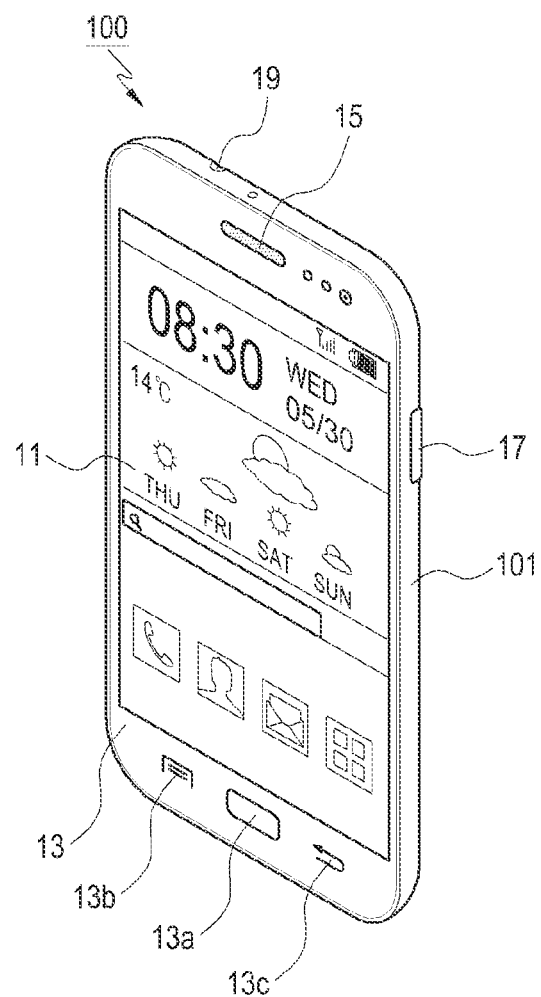
FIG. 1 is a top perspective view diagram illustrating an electronic device according to an embodiment of the present disclosure.

Various embodiments of the present disclosure may be changed variously and may have a variety of embodiments, such that particular embodiments have been illustrated in the drawings and a related detailed description thereof will be provided below. However, this is not intended to limit the various embodiments to particular embodiments, and should be understood that all changes, equivalents, or substitutes included in the spirit and technical scope of the present disclosure are included in the scope of the present disclosure.

Although ordinal numbers such as "first," "second," and so forth may be used to describe various components of the present disclosure, those components are not limited by the terms. Such terms are used to distinguish components from each other. For example, a first component may be referred to as a second component and likewise, a second component may also be referred to as a first component, without departing from embodiments of the present disclosure. The term "and/or" used herein includes any and all combinations of one or more of the associated listed items.

Relative terms used based on illustrations in the drawings, such as a 'front surface', a 'back surface', a 'top surface', a 'bottom surface', etc, may be replaced with ordinal numbers such as 'first', 'second', etc. The order of the ordinal numbers such as 'first', 'second', and the like is a mentioned order or an arbitrarily set order, and may be changed as needed in accordance with embodiments of the present disclosure.

The terminology used herein is merely for describing certain embodiments of the present disclosure only and is not intended to be limiting of all embodiments of the present disclosure. As used herein, the singular forms are intended to include the plural forms as well, unless the context clearly indicates otherwise. The terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

Unless defined otherwise, all terms used herein have the same meanings as generally understood by those having ordinary knowledge in the technical field to which the present disclosure pertains. Terms generally used and defined in dictionaries should be interpreted as having meanings consistent with meanings construed in the context of the related art, and should not be interpreted as having ideal or excessively formal meanings unless defined explicitly in this application.

Throughout the drawings, like reference numerals will be understood to refer to like parts, components, and structures.

In various embodiments of the present disclosure, an electronic device may be an arbitrary device having a touch panel and may be referred to as a terminal, a portable terminal, a mobile terminal, a communication terminal, a portable communication terminal, a portable mobile terminal, a display, etc.

For example, the electronic device may be a smart phone, a cellular phone, a navigation device, a game console, a TeleVision (TV), a vehicle head unit, a laptop computer, a tablet computer, a Personal Media Player (PMP), a Personal Digital Assistant (PDA), etc. The electronic device may be a pocket-size portable communication terminal having a wireless communication function. The electronic device may be a flexible device or include a flexible display.

The electronic device may communicate with an external electronic device such as a server or may work by cooperating with the external electronic device. For example, the electronic device may transmit an image captured by a camera and/or position information detected by a sensor unit to the server over a network. The network may be, but not limited to, a mobile or cellular communication network, a Local Area Network (LAN), a Wireless Local Area Network (WLAN), a Wide Area Network (WAN), Internet, or a Small Area Network (SAN).

Figure 2:
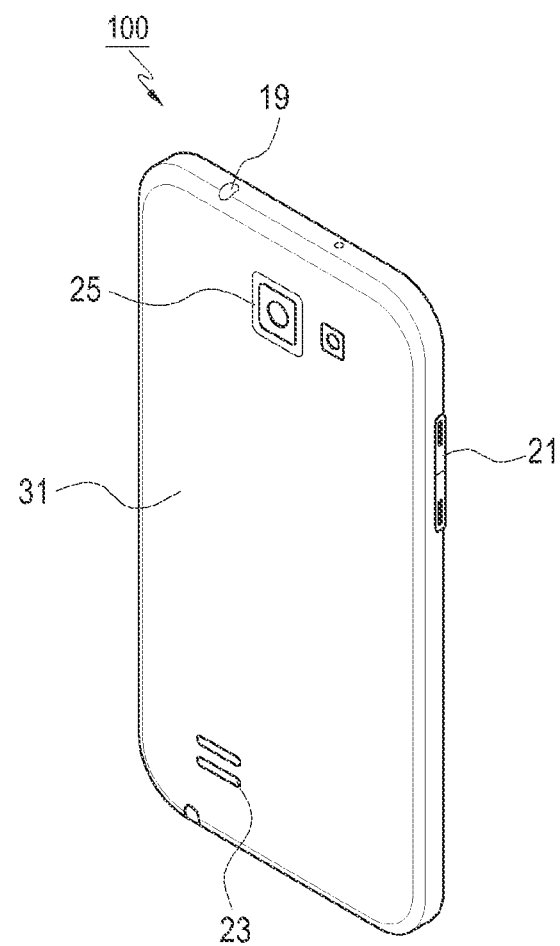
FIG. 2 is another top perspective view diagram illustrating an electronic device according to an embodiment of the present disclosure.

FIG. 1 is a top perspective diagram illustrating an electronic device according to an embodiment of the present disclosure. FIG. 2 is another top perspective diagram illustrating an electronic device according to an embodiment of the present disclosure.

Although FIGS. 1 and 2 illustrate a mobile communication terminal as an electronic device 100 according to an embodiment of the present disclosure, embodiments of the present disclosure are not limited to the mobile communication terminal, and other electronic devices in various forms may be used in accordance with embodiments of the present disclosure, as mentioned above.

The electronic device 100 includes a display 11, a keypad 13, and a receiver 15 installed on a front surface of a housing including a case member 101. The display 11 is a touch screen having a touch panel integrated thereto. The keypad 13 is positioned under the display 11, and includes a home button 13a, a menu button 13b, and a back button 13c. Electric components, such as a power key 17, an ear-jack socket 19, a volume key 21, and the like are disposed on a side surface of the case member 101. Positions of the power key 17, the ear-jack socket 19, and the volume key 21 may be changed according to a design of the electronic device 100. The display 11 including the touch screen, the keypad 13, and the receiver 15 may also be electronic components of the electronic device 100.

Although the term 'volume key' is used with respect to the volume key 21 according to an embodiment of the present disclosure, usage of the volume key 21 is not limited to volume control. For example, the volume key 21 may be used as a hot key for moving a menu, controlling a screen brightness, or executing a preset command. The preset command may include a voice guide indicating the current time, and transitioning into or terminating any of various modes, such as a voice call mode, a camera mode, etc. Various functions may be assigned to the volume key 21 depending to settings of the electronic device 100.

The electronic device 100 includes a cover member 31 that is removable from a back surface thereof. The cover member 31 includes an audio output hole 23 for outputting audio, and exposes a camera module 25. A user may remove the cover member 31 to replace a battery pack or a storage medium.

Figure 3:
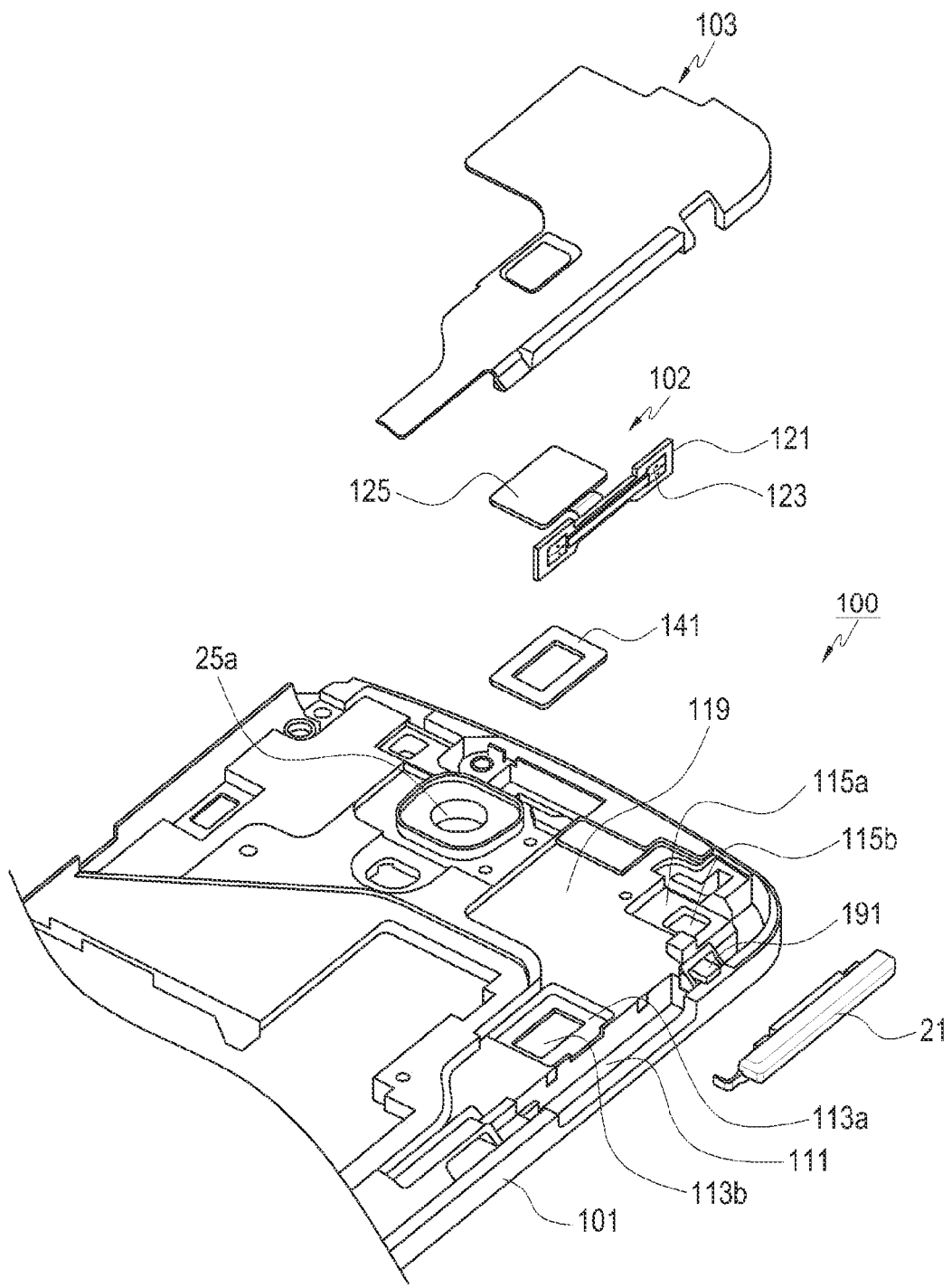
FIG. 3 is an exploded top perspective view diagram illustrating a portion of an electronic device according to an embodiment of the present disclosure.
Figure 4:
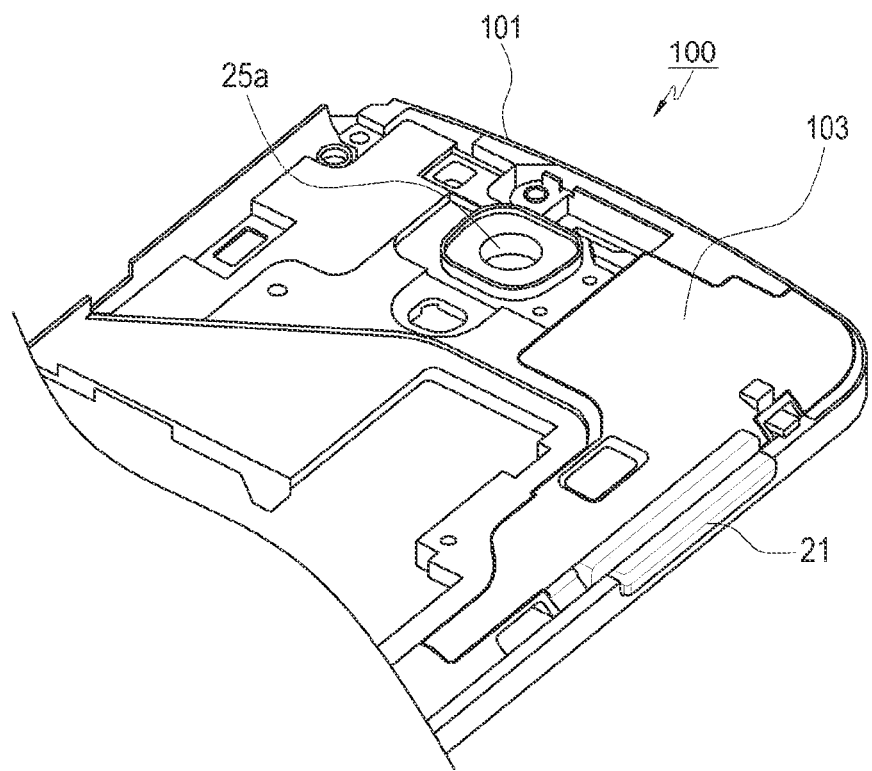
FIG. 4 is an enlarged top perspective view diagram illustrating a portion of an electronic device according to an embodiment of the present disclosure.
Figure 5:
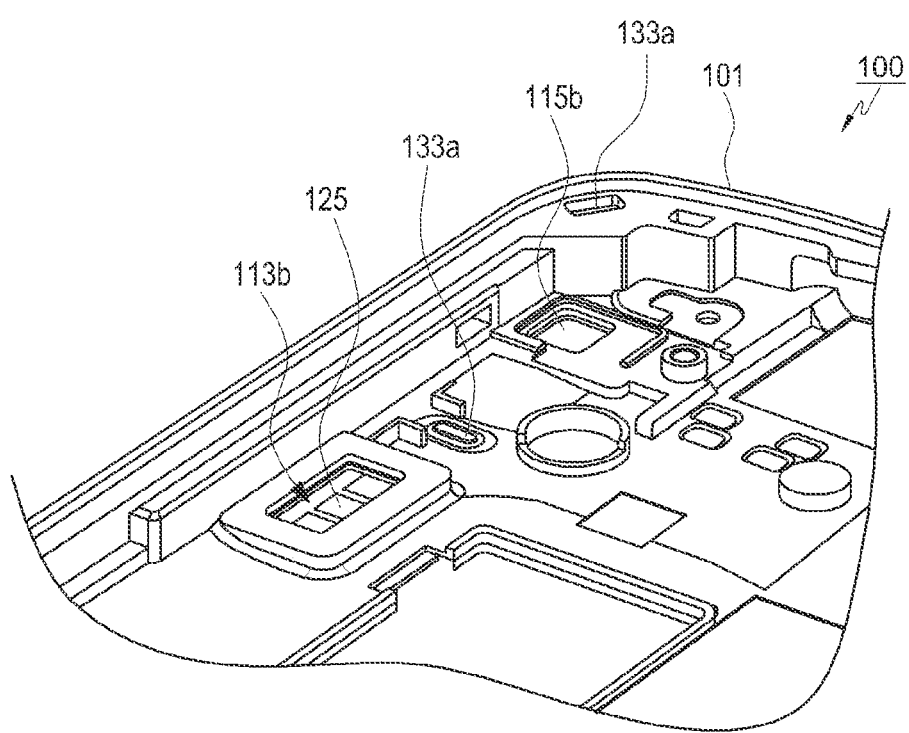
FIG. 5 is an enlarged bottom perspective view diagram illustrating an inner side of a portion of an electronic device according to an embodiment of the present disclosure.
Figure 6:
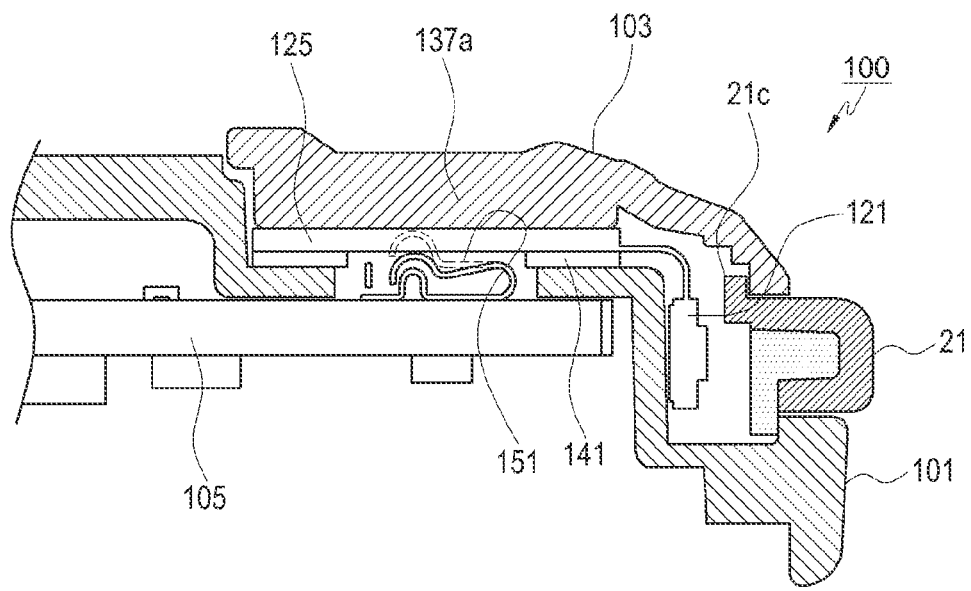
FIG. 6 is a cross-sectional view diagram taken from a portion of an electronic device according to an embodiment of the present disclosure.
Figure 7:
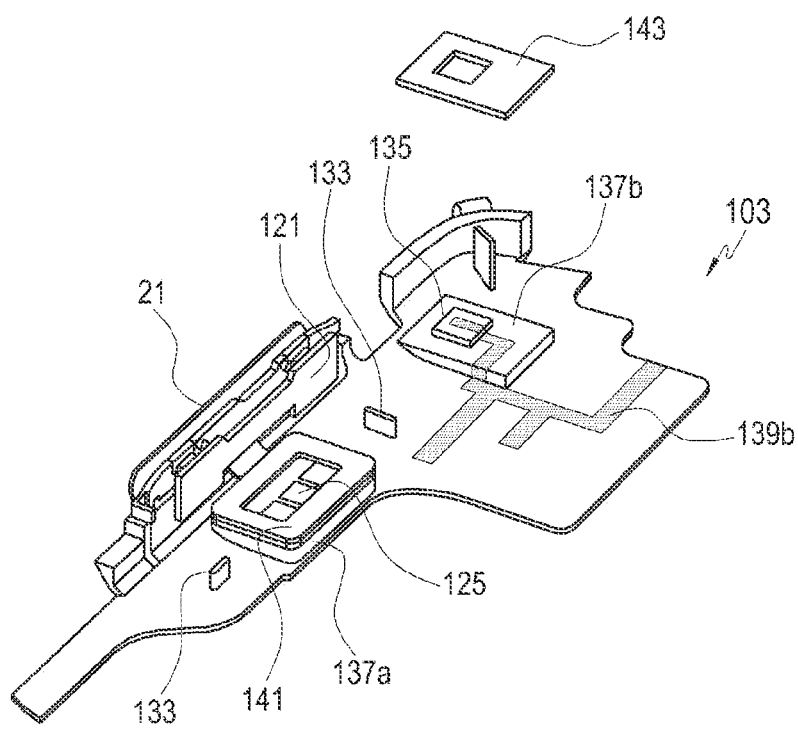
FIG. 7 is a bottom perspective view diagram illustrating a state in which an electronic part of an electronic device is installed in a cap portion according to an embodiment of the present disclosure.

FIG. 3 is an exploded top perspective diagram illustrating a portion of the electronic device 100 according to an embodiment of the present disclosure. FIG. 4 is an enlarged top perspective diagram illustrating a portion of the electronic device 100 according to one of various embodiments of the present disclosure. FIG. 5 is an enlarged bottom perspective diagram of an inner side of a portion of the electronic device 100 according to one of various embodiments of the present disclosure. FIG. 6 is a cross-sectional diagram taken from a portion of the electronic device 100 according to one of various embodiments of the present disclosure. FIG. 7 is a bottom perspective diagram illustrating a state in which electric components of the electronic device 100 are installed in a cap portion according to one of various embodiments of the present disclosure.

Referring to FIGS. 3 to 7, the electronic device 100 has a water-proof structure in a wiring path that disposes a manipulation member to be at least partially exposed to an outer surface of the case member 101 and is connected to the inside of the case member 101, for example, in openings 113b and 115b. Although a dome sheet corresponding to the volume key 21 is illustrated as an electric component 102 in FIGS. 3 to 7, embodiments of the present disclosure is not limited thereto. For example, the electric component 102 may include an external device connection socket such as the ear-jack socket 19 (described in further detail below), and may also include a power key, a speaker unit, a microphone unit, and an interface connector. The electric component 102 may be protected by being at least partially covered with the cap portion 103.

The case member 101 is described in more detail referring to FIG. 8 as follows.

Figure 8:
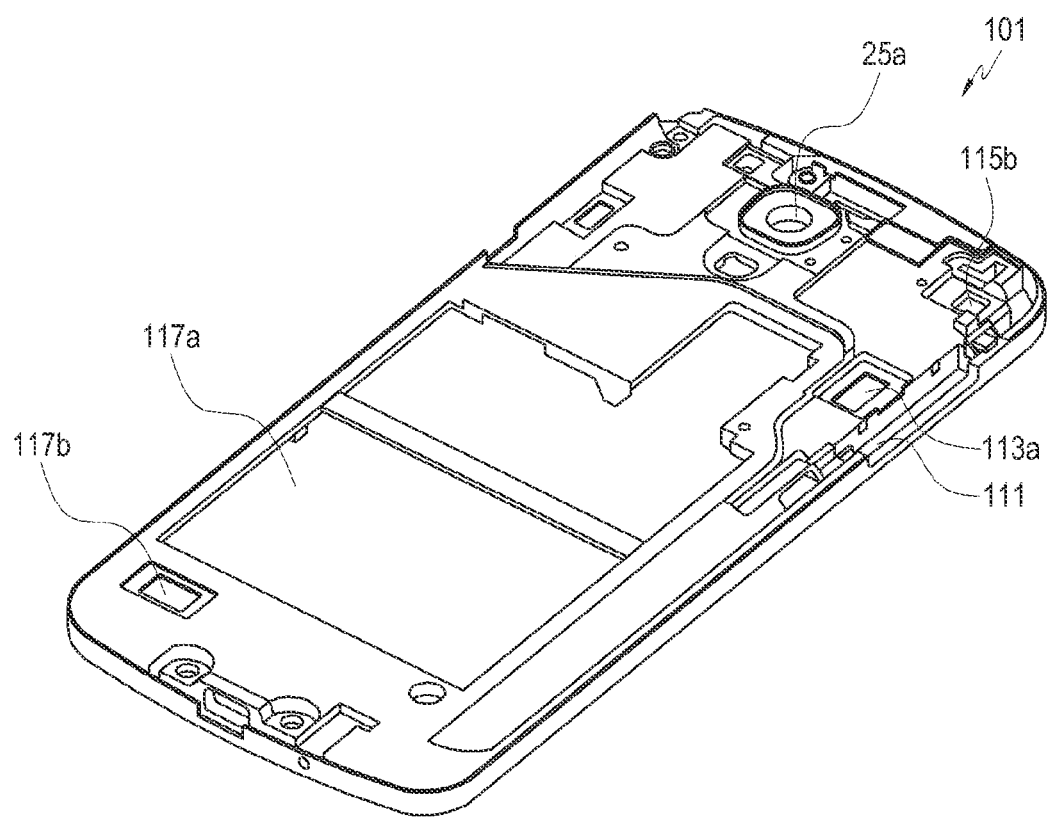
FIG. 8 is a top perspective view diagram illustrating a case member of an electronic device according to an embodiment of the present disclosure.

FIG. 8 is a top perspective diagram illustrating the case member 101 of the electronic device according to an embodiment of the present disclosure.

Figure 18:
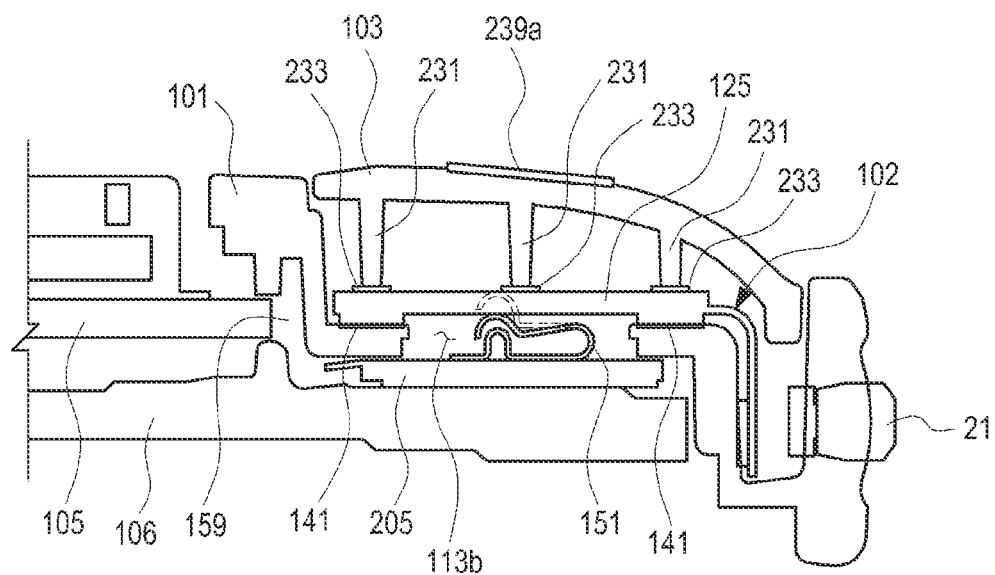
FIG. 18 is a cross-sectional view diagram taken from a portion of an electronic device according to another embodiment of the present disclosure.

Referring to FIGS. 1-3 and 8, the case member 101 forms a housing of the electronic device 100, in which the display 11 is coupled to a front surface of the case member 101 and the cover member 31 is coupled to a back surface of the case member 101. A battery mounting groove 117a and a speaker hole 117b are provided on the back surface of the case member 101. The speaker hole 117b is positioned corresponding to the audio output hole 23. A mounting hole 25a for mounting the camera module 25 is formed above the battery mounting groove 117a. As shown in FIG. 18, the electric component 102 is disposed on the side surface of the case member 101.

Referring back to FIGS. 1-3 and 8, a seating surface 119 is formed on an outer surface of the case member 101. The seating surface 119 may be formed on the outer surface of the case member 101, for example, on the back surface of the case member 101, such that a region is formed in a stepwise manner to a predetermined depth with respect to another region. Sealing grooves 113a and 115a are formed in the seating surface 119. Openings 113b and 115b passing through the case member 101 are formed in the sealing grooves 113a and 115a, respectively. A manipulation groove 111 is formed adjacent to the seating surface 119 in the case member 101. The seating surface 119 is positioned on the back surface of the case member 101, the manipulation groove 111 is positioned on the side surface of the case member 101 and connects to the sealing groove 113a. A hook 191 is provided on the side surface of the case member 101 to bind an accessory.

The cap portion 103 is described in more detail as follows with reference to FIG. 9.

Figure 9:
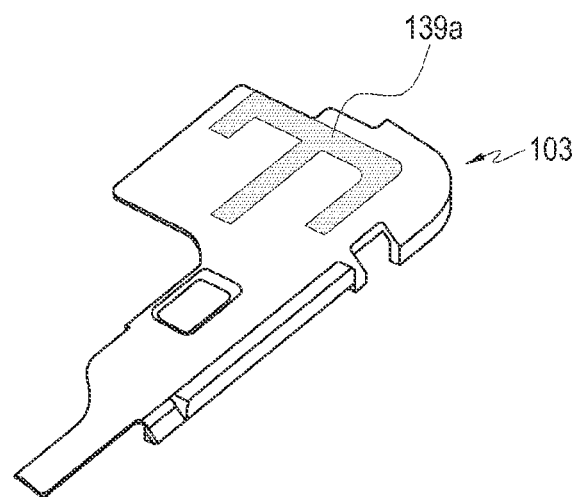
FIG. 9 is a top perspective view diagram illustrating a cap portion of an electronic device according to an embodiment of the present disclosure.

FIG. 9 is a top perspective diagram illustrating the cap portion 103 of the electronic device 100 according to an embodiment of the present disclosure.

Referring to FIGS. 3 and 9, the cap portion 103 has a shape corresponding to a shape of the seating surface 119 and is coupled to the seating surface 119. As the cap portion 103 is coupled to the seating surface 119, the outer surface of the cap portion 103 coincides with the outer surface of the case member 101. For example, the cap portion 103 may be manufactured to have a thickness corresponding to a depth of the seating surface 119. According to an alternative embodiment of the present disclosure, the thickness of the cap portion 103 may be manufactured to be different from the depth of the seating surface 119. A portion of the cap portion 103 is positioned on the side surface of the case member 101.

As shown in FIG. 7, the cap portion 103 may further include binding protrusions 133 formed in an inner side thereof, for coupling and fixing the cap portion 103 to the case member 101. The binding protrusions 133 are fused in a state of being inserted into insertion holes 133a formed in the seating surface 119, thereby fixing the cap portion 103 to the case member 101. Insertion holes 133a corresponding to the binding protrusions 133 may be formed on the seating surface 119.

Referring to FIG. 7, at least one protruding portions 137a and 137b are formed on the inner side of the cap portion 103. In the currently-described embodiment of the present disclosure, the protruding portions 137a and 137b are formed in pair on the inner surface of the cap portion 103. Referring to FIGS. 3 and 7, the protruding portions 137a and 137b are coupled to the sealing grooves 113a and 115a, respectively. According to an embodiment of the present disclosure, at least one of the protruding portions 137a and 137b may be provided with a shape-matching portion 135 corresponding to at least one of the corresponding openings 113b and 115b. In the currently-described embodiment, as shown in FIGS. 3 and 7, a structure in which the shape-matching portion 135 protrudes from protruding portion 137b, and the shape-matching portion 135 is engaged with opening 115b.

Referring to FIGS. 7 and 9, conductive patterns 139a and 139b are formed on the outer and inner surfaces, respectively, of the cap portion 103. The conductive patterns 139a and 139b may be used as radiators of an antenna device. For example, the conductive patterns 139a and 139b may be provided as an antenna for wireless communication, such as a Local Area Network (LAN), Near Field Communication (NFC), Bluetooth, etc. At least a portion of the conductive patterns 139a and 139b is positioned on the shape-matching portion 135 in the inner side of the cap portion 103. Thus, when the cap portion 103 is coupled to the case member 101, a portion of the conductive patterns 139a and 139b is situated in the inner side of the case member 101.

Depending on a type of an electric component, a corresponding manipulation member may be needed in an electronic device according to an embodiment of the present disclosure. For example, a power key or a volume key may be implemented with a physical switch, and a manipulation member for operating the switch may be installed in such an electronic device.

A manipulation member provided on the electronic device 100 according to an embodiment of the present disclosure is described in more detail as follows with reference to FIG. 10.

Figure 10:
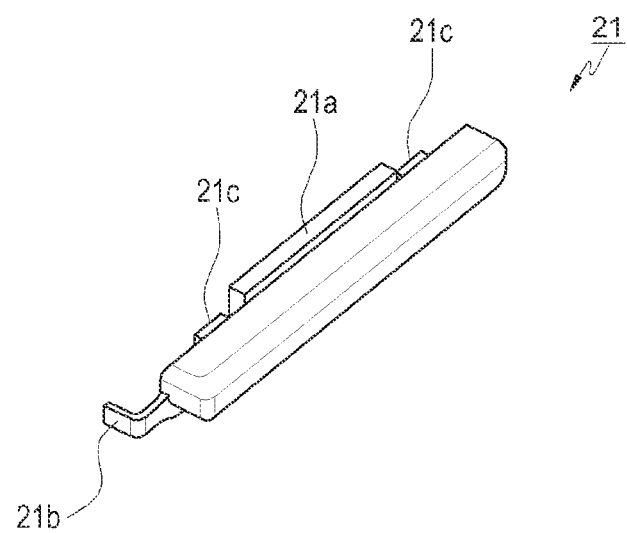
FIG. 10 is a top perspective diagram illustrating a manipulation member of an electronic device according to an embodiment of the present disclosure.

FIG. 10 is a top perspective diagram illustrating a manipulation member of the electronic device 100 according to one of various embodiments of the present disclosure.

Referring to FIG. 10, a manipulation member (i.e., the volume key 21) is installed in the manipulation groove 111 such that at least a portion of the manipulation member is exposed at a side of the electronic device 100. Hereinafter, the terms 'volume key' and 'manipulation member' are each described with respect to the same reference numeral '21'.

A flange 21a and a binding piece 21b are formed in the manipulation member 21. As shown in FIGS. 3 and 8, the manipulation member 21 is installed in the manipulation groove 111, while facing the electric component 102, for example, a dome sheet 121. Referring back to FIG. 10, the flange 21a at least partially protrudes from a circumference of the manipulation member 21, and the binding piece 21b extends from a side of the manipulation member 21.

When the manipulation member 21 is positioned in the manipulation groove 111, the binding piece 21b is fixed and bound to the case member 101 and the flange 21a is bound to the inner side of the case member 101 or the cap portion 103. Thus, the manipulation member 21 is secured within the case member 101.

Manipulation protrusions 21c are formed in the inner side of the manipulation member 21. The manipulation protrusions 21c may be disposed corresponding to switch members, for example, dome switches. When the user presses the manipulation member 21, the manipulation protrusions 21c may operate their corresponding switch members.

An example of the electric component 102 according to an embodiment of the present disclosure is described as follows with reference to FIG. 11.

Figure 11:
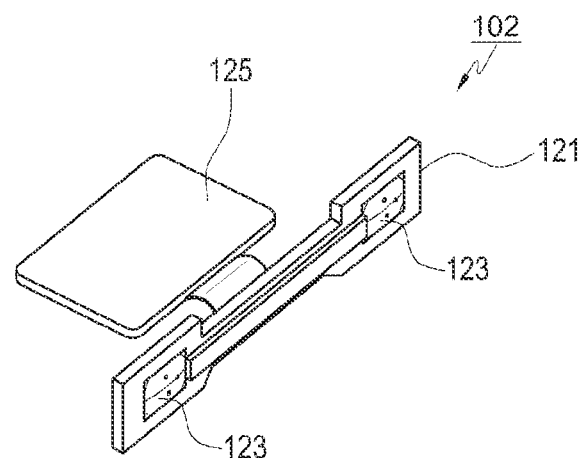
FIG. 11 is a top perspective view diagram illustrating an electronic part of an electronic device according to an embodiment of the present disclosure.

FIG. 11 is a top perspective diagram illustrating the electric component 102 of the electronic device 100 according to an embodiment of the present disclosure.

Referring to FIG. 11, the electric component 102 includes a dome sheet 121. The dome sheet 121 includes at least one dome switch 123, and is connected to a main circuit board 105 (as shown in FIGS. 6 and 17-21) of the electronic device 100 through a circuit board 125, for example, a Flexible Printed Circuit Board (FPCB). Referring to FIGS. 3 and 11, the dome sheet 121 is disposed in the manipulation groove 111 to face the manipulation member 21. A portion of the circuit board 125 extending from the dome sheet 121 is positioned in the first sealing groove 113a of the sealing grooves 113a and the opening 113b. In the first sealing groove 113a, the circuit board 125 contacts the outer surface of the case member 101, i.e., the bottom of the first sealing groove 113a to seal the opening 113b.

As shown in FIGS. 3, 6, 7, and 18, the electronic device 100 further includes a sealing member 141. The sealing member 141 is disposed between the circuit board 125 and the case member 101, e.g., the first sealing groove 113a. The sealing member 141 may be formed of an elastic material such as silicon, urethane, Poron, etc., and may include an adhesive member (not shown) such as a double-sided tape. The adhesive member stably fixes the dome sheet 121 and the circuit board 125 onto the case member 101. The sealing member 141 is provided between the circuit board 125 and the case member 101, further improving sealing performance of the opening 113b. Thus, a dust-proof/water-proof structure is implemented in a wiring path of the electric component 102.

A structure in which the electric component 102 is assembled to the case member 101 according to an embodiment of the present disclosure is described in more detail as follows with reference to FIGS. 5-8. When the dome sheet 121 is positioned in the manipulation groove 111 and a portion of the circuit board 125 is positioned in the first sealing groove 113a, the portion of the circuit board 125 may be attached to the bottom of the first sealing groove 113a. For example, the sealing member 141 includes an adhesive member such as a double-side tape. The sealing member 141 forms a closed curve that encloses the opening 113b formed in the first sealing groove 113a. As the circuit board 125 is attached and fixed to the first sealing groove 113a, the opening 113b is sealed by the circuit board 125. The circuit board 125 is partially exposed to the inner side of the case member 101 through the opening 113b.

A portion of the manipulation member 21 is disposed in the manipulation groove 111 while being bound to the inner side of the case member 101. When the manipulation member 21 is disposed in the manipulation groove 111, the cap portion 103 is coupled to the seating surface 119 in a way that encloses at least a portion of the electric component 102 and at least a portion of the manipulation member 21. Another portion of the manipulation member 21, i.e., the flange 21a, is bound to the inner side of the cap portion 103. Thus, the manipulation member 21 is disposed in the manipulation groove 111.

The first protruding portion 137a among the protruding portions formed on the inner side of the cap portion 103 is engaged with the first sealing groove 113a. As being engaged with the first sealing groove 113a, the first protruding portion 137a pressurizes the circuit board 125. The sealing member 141 is formed of an elastic material, and reinforces sealing between the circuit board 125 and the case member 101 while being compressed by the first protruding portion 137a.

The second protruding portion 137b of the protruding portions formed in the cap portion 103 is engaged with the second sealing groove 115a of the sealing grooves. When the second protruding portion 137b is engaged with the second sealing groove 115a, the shape-matching portion 135 is engaged with the second opening 115b formed in the second sealing groove 115a. To form a water-proof structure in the second opening 115b, the electronic device 100 further includes a second sealing member 143. The second sealing member 143 is attached to the second protruding portion 137b on a circumference of the shape-matching portion 135. If the second sealing member 143 is includes a double-sided tape (not shown), the double-sided tape may be attached to the bottom of the second sealing groove 115a on a circumference of the second opening 115b. When the cap portion 103 is coupled to the seating surface 119, the second protruding portion 137b pressurizes and compresses the second sealing member 143, reinforcing sealing performance in the second opening 115b.

The main circuit board 105 is installed in the case member 101. To connect the electric component 102 to the main circuit board 105, the electronic device 100 includes at least one connection member 151. The connection member 151 is mounted on the main circuit board 105 and a portion thereof protrudes to an exterior of the case member 101 through the opening 113b of the first sealing groove 113a. When a portion of the circuit board 125 is disposed in the first sealing groove 113a, the connection member 151 contacts the circuit board 125. As the connection member 151 contacts the circuit board 125, the electric component 102 (as shown in FIG. 3, for example) is electrically connected to the main circuit board 105.

A disposition structure of the connection member 151 according to an embodiment of the present disclosure is described as follows with reference to FIGS. 12 to 14.

Figure 12:
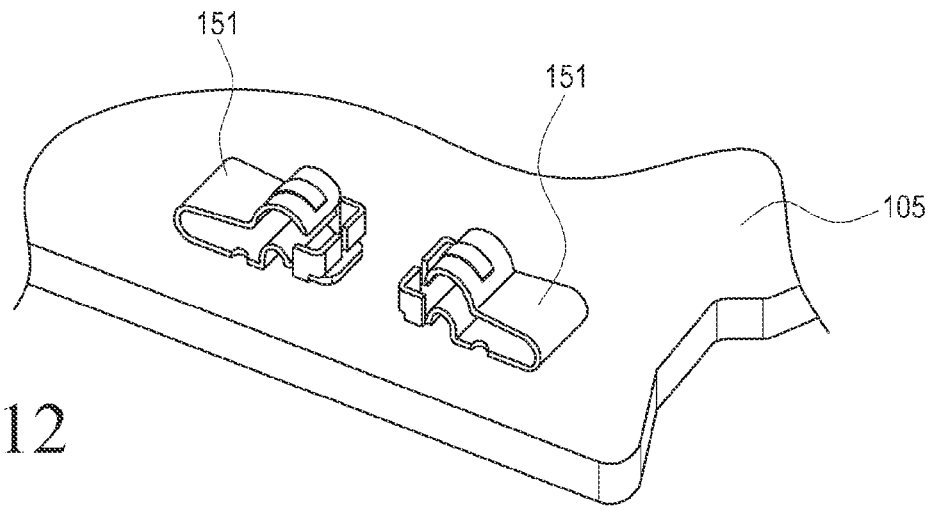
FIG. 12 is an enlarged perspective view diagram illustrating a portion of a main circuit board of an electronic device according to an embodiment of the present disclosure.

FIG. 12 is an enlarged perspective diagram illustrating a portion of the main circuit board 105 of the electronic device 100 according to an embodiment of the present disclosure. FIG. 13 is a perspective diagram illustrating a modified example of the main circuit board 105 of the electronic device 100 according to an embodiment of the present disclosure. FIG. 14 is a perspective diagram illustrating another modified example of the main circuit board 105 of the electronic device 100 according to an embodiment of the present disclosure.

Figure 13:
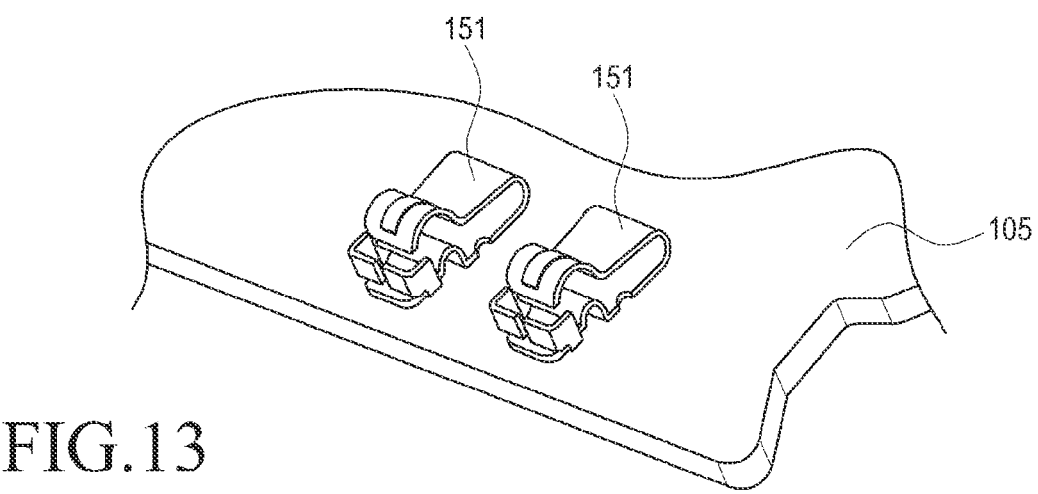
FIG. 13 is a perspective view diagram illustrating a modified example of a main circuit board of an electronic device according to an embodiment of the present disclosure.

Referring to FIGS. 12 and 13, the connection member 151 includes a spring member, such as a C-clip, for example. The C-clip includes an elastic body such as a leaf spring, and stably maintains contact with the circuit board 125. When the connection member 151 is mounted on the main circuit board 105, its position or disposition direction may be set variously to fit for circuit wiring of the main circuit board 105.

Figure 14:
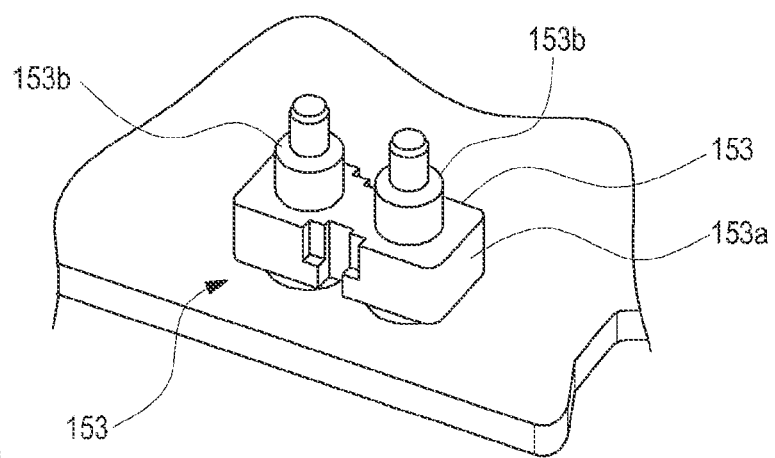
FIG. 14 is a perspective view diagram illustrating another modified example of a main circuit board of an electronic device according to an embodiment of the present disclosure.

Referring to FIG. 14, the connection member 151 may include a pogo pin module 153. The pogo pin module 153 includes at least one pogo pin 153b fixed to a case 153a.

The connection member 151 of FIG. 14 including the pogo pin module 153 maintains contact with the circuit board 125 at least a portion thereof with its self-elastic force. Moreover, the first protruding portion 137a (see FIG. 7) pressurizes and supports the circuit board 125, further stabilizing contact between the connection member 151 and the circuit board 125.

Referring to FIGS. 6-7, as well as FIGS. 12-14, when the conductive patterns 139a and 139b are used as radiators of an antenna device, a connection member for connecting the conductive patterns 139a and 139b to the main circuit board 105 may be further installed. The connection member for connecting the conductive patterns 139a and 139b to the main circuit board 105 may be implemented using the connection member 151 for connecting the electric component 102 to the main circuit board 105. Thus, a structure for connecting the conductive patterns 139a and 139b to the main circuit board 105 is not described in further detail herein.

Figure 15:
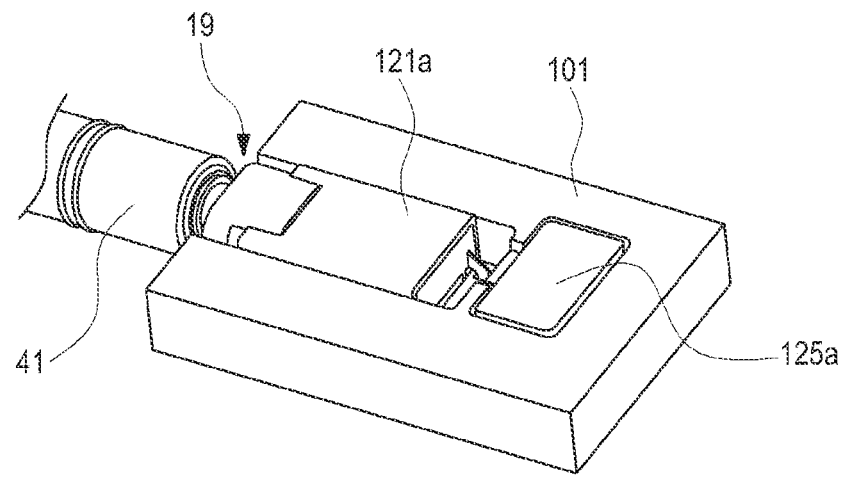
FIG. 15 is an enlarged perspective view diagram illustrating a portion of an electronic device according to another embodiment of the present disclosure.
Figure 16:
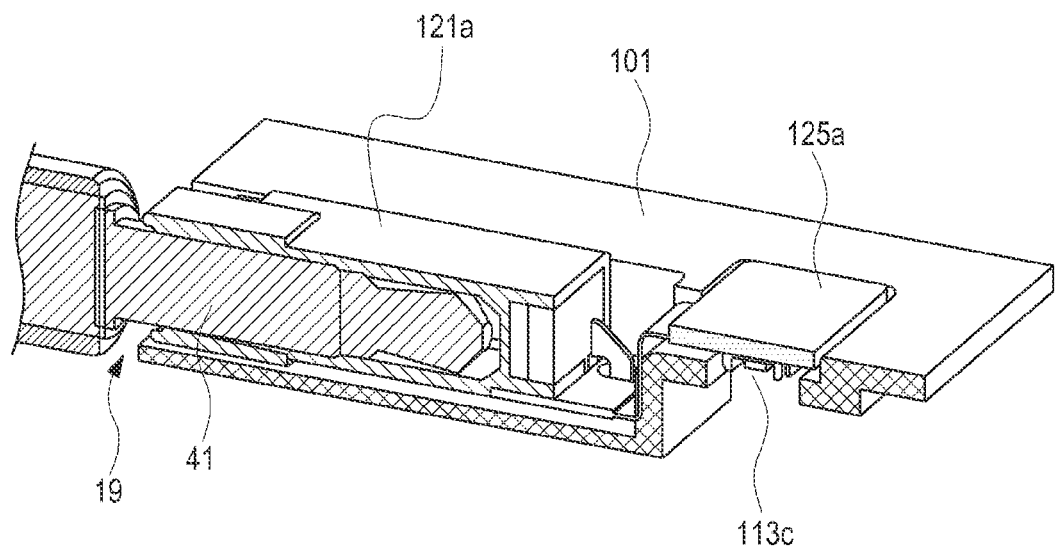
FIG. 16 is an enlarged perspective view diagram illustrating a portion of an electronic device according to another embodiment of the present disclosure.

FIG. 15 is an enlarged perspective diagram illustrating a portion of the electronic device 100 according to another embodiment of the present disclosure, and FIG. 16 is an enlarged perspective diagram illustrating a portion of the electronic device 100 according to another embodiment of the present disclosure.

As mentioned above, the electric components of the electronic device 100 may include an external device connection socket or connector. In FIGS. 15 and 16, the ear-jack socket 19, to which an earphone plug 41 is connected, is illustrated as an electric component of the electronic device 100. The ear-jack socket 19 includes a socket body 121a mounted on the outer surface of the case member 101 and a second circuit board 125a extending from the socket body 121a. A portion of the second circuit board 125a contacts the case member 101, thus sealing a third opening 113c formed in the case member 101. When the portion of the second circuit board 125a contacts the case member 101, a sealing member, e.g., an elastic adhesive member, is used to improve water-proof performance between the second circuit board 125a and the case member 101, such as described herein with reference to other embodiments of the present disclosure.

Figure 17:
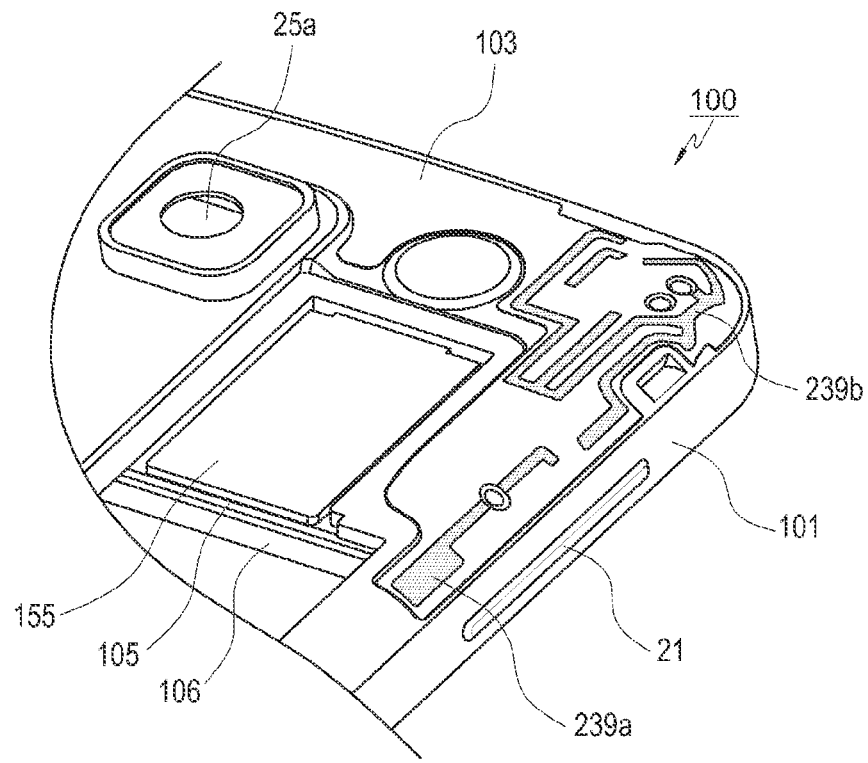
FIG. 17 is an enlarged top perspective view diagram illustrating a portion of an electronic device according to another embodiment of the present disclosure.
Figure 19:
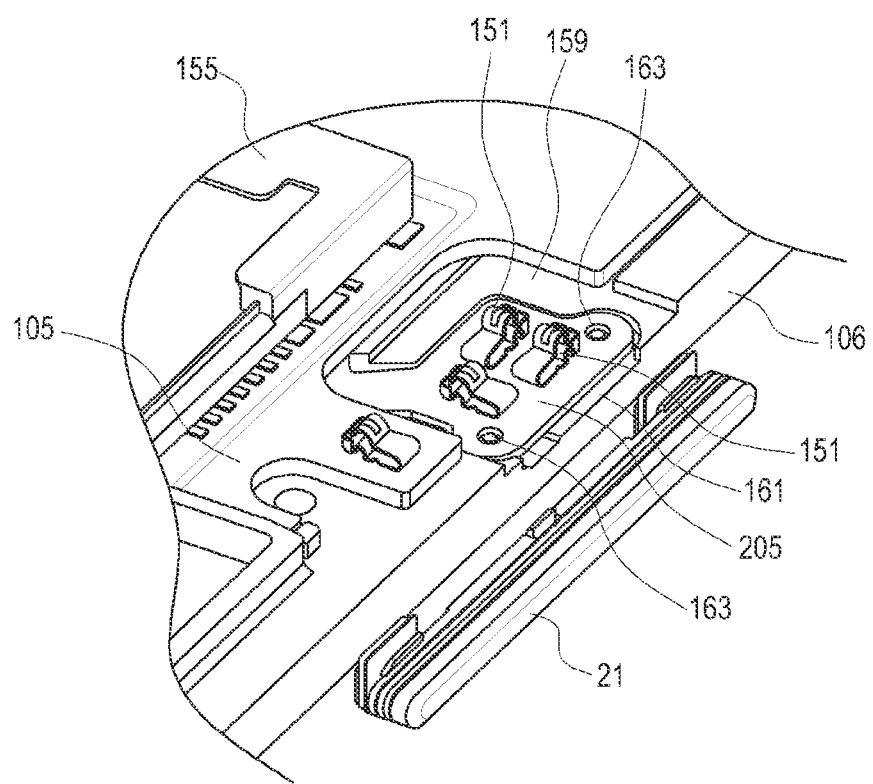
FIG. 19 is an enlarged top perspective diagram illustrating an internal structure of an electronic device according to another embodiment of the present disclosure.

FIG. 17 is an enlarged top perspective diagram illustrating a portion of the electronic device 100 according to another embodiment of the present disclosure. FIG. 18 is a cross-sectional diagram taken from a portion of the electronic device 100 according to another embodiment of the present disclosure. FIG. 19 is an enlarged top perspective diagram illustrating an internal structure of the electronic device 100 according to another embodiment of the present disclosure.

In a description of the electronic device 100 according to the current embodiment of the present disclosure with reference to FIGS. 17-19, certain reference numerals used with respect to previously-described embodiments are used again for similar components.

As shown in FIGS. 17 to 19, the electronic device 100 according to the current embodiment may have the connection member 151 disposed on an auxiliary circuit board 205 disposed in adjacent to the main circuit board 105. The connection member 151 may include a C-clip or a pogo pin module. In the present example of FIGS. 17-19, the connection member 151 includes a C-clip.

Disposition of the main circuit board 105 and the auxiliary circuit board 205 according to an embodiment of the present disclosure is described in more detail as follows with reference to FIGS. 20 and 21.

Figure 20:
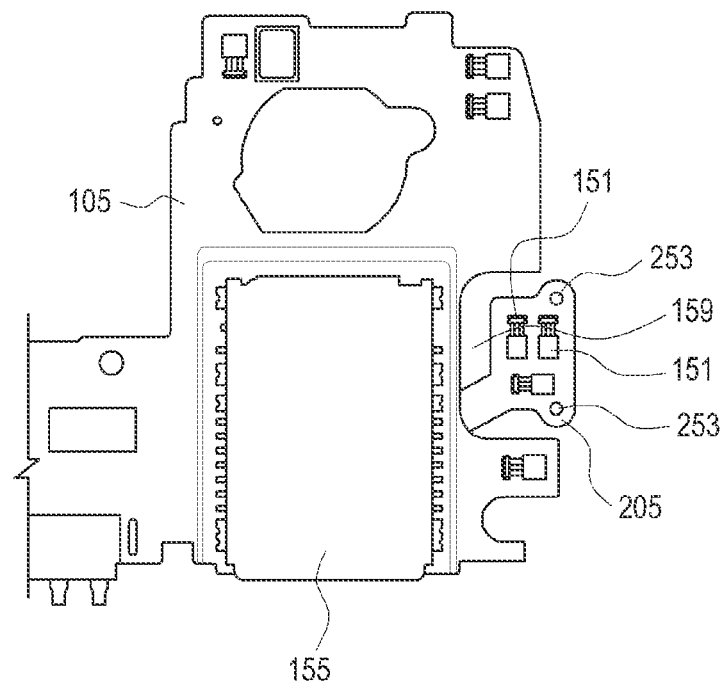
FIG. 20 is a planar view diagram illustrating a state in which an auxiliary circuit board is disposed on a main circuit board of an electronic device according to another embodiment of the present disclosure.

FIG. 20 is a planar view diagram illustrating a state in which the auxiliary circuit board 205 is disposed on the main circuit board 105 of the electronic device 100 according to another embodiment of the present disclosure. FIG. 21 is a bottom view diagram illustrating a state in which the auxiliary circuit board 205 is disposed on the main circuit board 105 of the electronic device 100 according to another embodiment of the present disclosure.

Figure 21:
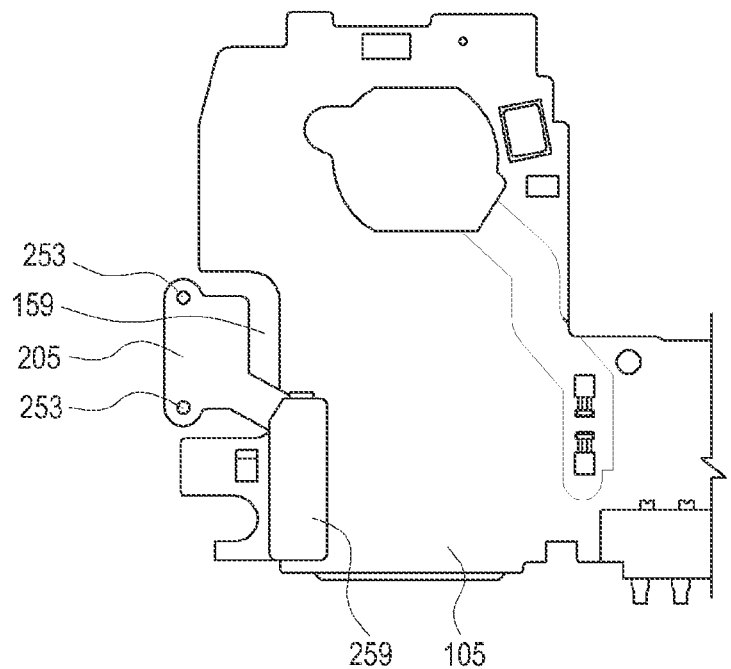
FIG. 21 is a bottom view diagram illustrating a state in which an auxiliary circuit board is disposed on a main circuit board of an electronic device according to another embodiment of the present disclosure.

As shown in FIGS. 20 and 21, a socket 155 for a storage medium and various integrated circuit chips (not shown) are disposed on the main circuit board 105. A Subscriber Identification Module (SIM) card or various memory cards are examples of the storage medium connected to the socket 155. The auxiliary circuit board 205 is disposed adjacent to the main circuit board 105. In the currently-described embodiment of the present disclosure according to FIGS. 20-21, the main circuit board 105 includes a cut portion 159 formed by removing a portion of an edge of the main circuit board 105. At least a portion of the auxiliary circuit board 205 is positioned on the cut portion 159, and a connector portion 259 extending from a side is connected to the main circuit board 105. The auxiliary circuit board 205 is electrically connected to the main circuit board 105 through the connector portion 259.

On the auxiliary circuit board 205, at least one fixing hole 253 is formed to enable the auxiliary circuit board 205 to be connected to the inside of the case member 101. In the currently-described embodiment of the present disclosure, a pair of fixing holes 253 are formed in respective edges of the auxiliary circuit board 205, and the auxiliary circuit board 205 is fixed to the inside of the case member 101 through a bracket 106 described in further detail herein below.

The connection members 151 are disposed on a surface of the auxiliary circuit board 205 and are at least partially received in the cut portion 159. The connection members 151 are electrically connected to the main circuit board 105 through the auxiliary circuit board 205 and the connector potion 259 and contact the circuit board 125.

Referring to FIGS. 17 to 19, the cap portion 103 is seated on the outer surface of the case member 101. The cap portion 103 includes at least one of radiators 239a and 239b. If the plurality of radiators 239a and 239b are disposed in the cap portion 103, the radiators 239a and 239b may independently operate in different frequency bands. The electronic device 100 further includes at least one of pressurizing members 231 formed in the cap portion 103. If the cap portion 103 is coupled to the case member 101, the pressurizing members 231 may pressurize the circuit board 125 of the electric component 102 to urge the circuit board 125 to contact the case member 101. According to an embodiment of the present disclosure, an elastic member 233 formed of sponge or rubber, for example, is interposed between the pressurizing members 231 and the circuit board 125.

The circuit board 125 is attached to the case member 101 by the sealing member 141 on a circumference of the opening 113b, while closing the opening 113b. The sealing member 141 includes a double-sided tape (not shown) to form a sealing/water-proof structure between the circuit board 125 and the case member 101.

The electronic device 100 further includes the bracket 106 installed inside the case member 101. When the bracket 106 is disposed in the case member 101, the main circuit board 105 and the auxiliary circuit board 205 is fixed between the bracket 106 and the case member 101. The bracket 106 is provided with a seating groove 161 and a fixing protrusion 163. The auxiliary circuit board 205 is fixed to the seating groove 161. The fixing protrusion 163 is engaged with the fixing hole 253 to provide a fixing means for the auxiliary circuit board 205. Once the auxiliary circuit board 205 is mounted and fixed to the bracket 106, the connection member 151 protrudes from a surface of the bracket 106.

When the bracket 106 is mounted and fixed to the case member 101, at least a portion, e.g., an edge, of the main circuit board 105 is engaged between the bracket 106 and the case member 101, such that the main circuit board 105 is fixed. A surface of the auxiliary circuit board 205 is supported in the bracket 106, e.g., in the seating groove 161, and an edge of another surface of the auxiliary circuit board 205 is supported and fixed by the case member 101 on a circumference of the opening 113b.

Once the main circuit board 105 and the bracket 106 are mounted and fixed to the case member 101, at least a portion of the opening 113b is received in the cut portion 159. When the auxiliary circuit board 205 is supported and fixed to the inner side of the case member 101, the connection member 151 protrudes to the outer side of the case member 101 through the opening 113b. In this state, as mentioned previously, the connection member 151 may be at least partially received in the opening 113b and the cut portion 159. The circuit board 125 is attached and fixed to the outer side of the case member 101 in the opening 113b, such that a portion of the connection member 151 protruding to the outer side of the case member 101 is electrically connected to the circuit board 125.

The above-described disposition structure secures more spacing of the auxiliary circuit board 205 and the connection member 151 from the outer side of the cap portion 103 including the radiator 239a. For example, the auxiliary circuit board 205 may be disposed adjacent to the main circuit board 105 and further away from a radiator (e.g., radiator 239a) toward the bracket 106. Generally, the radiator may show its unique radiation characteristics when it is secured at a sufficient interval from various circuit devices. When a portion of a radiator (for example, the radiator 239a) disposed in the cap portion 103 is positioned in the opening 113b, a sufficient interval from the circuit board 125 and the connection members 151 to the radiator 239a is provided, such that the electronic device 100 according to the current embodiment of the disclosure is provided with secure stable radiation characteristics of the radiator 239a.

While the present disclosure has been particularly illustrated and described with reference to certain embodiments thereof, various modifications or changes can be made without departing from the scope of the present disclosure. For example, although a flexible printed circuit board is illustrated as a circuit board provided in an electric component in a detailed embodiment of the present disclosure, a portion of the circuit board may be provided as a flexible printed circuit board and another portion of the circuit board may be provided as a rigid circuit board. The rigid circuit board portion may be positioned in a sealing groove of a case portion, and a portion connecting a dome sheet or a socket body with the rigid circuit board portion may be provided as the flexible printed circuit board. If a portion of the circuit board is provided as the flexible printed circuit board and another portion thereof is provided as the rigid printed circuit board, wiring along the curve of the case member using the flexible printed circuit board portion is easy to perform and the circuit board stably contacts and is fixed to the sealing groove by using the rigid circuit board portion.

Various embodiments of the present disclosure may implement an electronic device having a stable water-proof structure in a wiring path, for example, in a path through which introduction of foreign substances or moisture is prevented. Thus, a stable operation of the electronic device may be guaranteed in spite of changes in temperature or humidity. Moreover, various embodiments of the present disclosure may implement water-proof and dust-proof functions with a simple structure, contributing to miniaturization of the electronic device.

While the present disclosure has been particularly illustrated and described with reference to certain embodiments thereof, various modifications or changes can be made without departing from the scope of the present disclosure. Therefore, the scope of the present disclosure is not limited to the described embodiments, but is instead defined by the scope of the following claims and any equivalents thereof.

What is claimed is:

1. An electronic device comprising:
    a case member including an opening;
    an electric component provided on the case member;
    a circuit board attached and fixed to an outer surface of the case member to seal the opening and connected to the electric component;

a main circuit board disposed inside the case member;
a connection member mounted on or above the main circuit board and positioned in the opening;
a cap portion coupled to the outer surface of the case member; and
a pressurizing member formed on the cap portion,
wherein the connection member includes a spring member and a portion of the connection member protrudes to an exterior of the case member via the opening and contacts the circuit board, and
wherein the pressurizing member urges the circuit board to contact the case member.

2. The electronic device of claim 1, further comprising a sealing member provided on a circumference of the opening,
wherein the sealing member is in a closed-curve shape enclosing the opening and forms a sealing structure between the circuit board and the case member.

3. The electronic device of claim 1, wherein the connection member comprises at least one of a C-clip and a pogo pin module.

4. The electronic device of claim 2, wherein the sealing member comprises an adhesive member including a double-side tape.

5. The electronic device of claim 2, further comprising:
an auxiliary circuit board disposed adjacent to the main circuit board inside the case member and electrically connected to the main circuit board;
wherein the connection member is installed on the auxiliary circuit board.

6. The electronic device of claim 5, further comprising:
a cut portion formed by removing a portion of the main circuit board,
wherein at least a portion of the auxiliary circuit board is disposed in the cut portion and the connection member is at least partially received in the opening.

7. The electronic device of claim 5, further comprising:
a bracket received in the case member,
wherein the main circuit board and the auxiliary circuit board are interposed between the bracket and the case member.

8. The electronic device of claim 7, wherein a surface of the auxiliary circuit board is supported in the bracket and an edge of another surface of the auxiliary circuit board is supported by the case member on the circumference of the opening.

9. The electronic device of claim 7, further comprising:
a seating groove formed in the bracket,
wherein the auxiliary circuit board is fixed to the seating groove.

10. The electronic device of claim 5, further comprising:
at least one radiator disposed in the cap portion,
wherein at least a portion of the radiator is positioned in the opening.

11. The electronic device of claim 5, further comprising:
at least one radiator disposed in the cap portion,
wherein the auxiliary circuit board is disposed in adjacent to the main circuit board and away from the radiator toward a bracket.

12. The electronic device of claim 1, wherein the circuit board comprises a flexible printed circuit board extending from the electric component.

13. The electronic device of claim 1, wherein the electric component comprises a dome sheet in which at least one dome switch is provided.

14. The electronic device of claim 1, wherein the electric component comprises an external device connection socket.

15. The electronic device of claim 1, wherein the cap portion at least partially covers the electric component.

16. The electronic device of claim 15, further comprising a conductive pattern formed on an inner surface or an outer surface of the cap portion.

17. The electronic device of claim 16, further comprising:
a second opening formed in the case member,
wherein when the cap portion is coupled to the case member, at least a portion of the conductive pattern is positioned in the second opening.

18. The electronic device of claim 17, further comprising:
a second sealing member disposed on a circumference of the second opening to form a sealing structure between the cap portion and the case member.

19. The electronic device of claim 1, further comprising:
a manipulation member provided in the case member and facing the electric component,
wherein the electric component comprises a dome sheet including at least one dome switch, and the dome switch is manipulated by the manipulation member.

20. The electronic device of claim 19, further comprising:
a manipulation groove formed on an outer surface of the case member,
wherein the electric component and the manipulation member are received in the manipulation groove.

21. The electronic device of claim 20, further comprising:
a sealing groove formed on an outer surface of the case member and connected to the manipulation groove,
wherein the opening is formed in the sealing groove, and the circuit board comprises a flexible printed circuit board extending from the electric component.

22. The electronic device of claim 21, further comprising:
a sealing member attached to a bottom of the sealing groove on a circumference of the opening,
wherein the sealing member forms a sealing structure between a portion of the circuit board and the sealing groove.

23. The electronic device of claim 19,
wherein the cap portion at least partially encloses the electric component and the manipulation member.

24. The electronic device of claim 23, further comprising:
a flange formed on an outer circumferential surface of the manipulation member,
wherein the flange is bound to an inner side of the cap portion to bind the manipulation member in the cap portion.

25. The electronic device of claim 23, further comprising:
a protruding portion formed on an inner surface of the cap member,
wherein the protruding portion pressurizes a portion of the circuit board to urge the circuit board to contact the case member.

* * * * *